Dec. 31, 1963   M. L. KUROWSKI   3,115,863
AIRCRAFT ALTIMETERS
Filed June 17, 1960   2 Sheets-Sheet 1
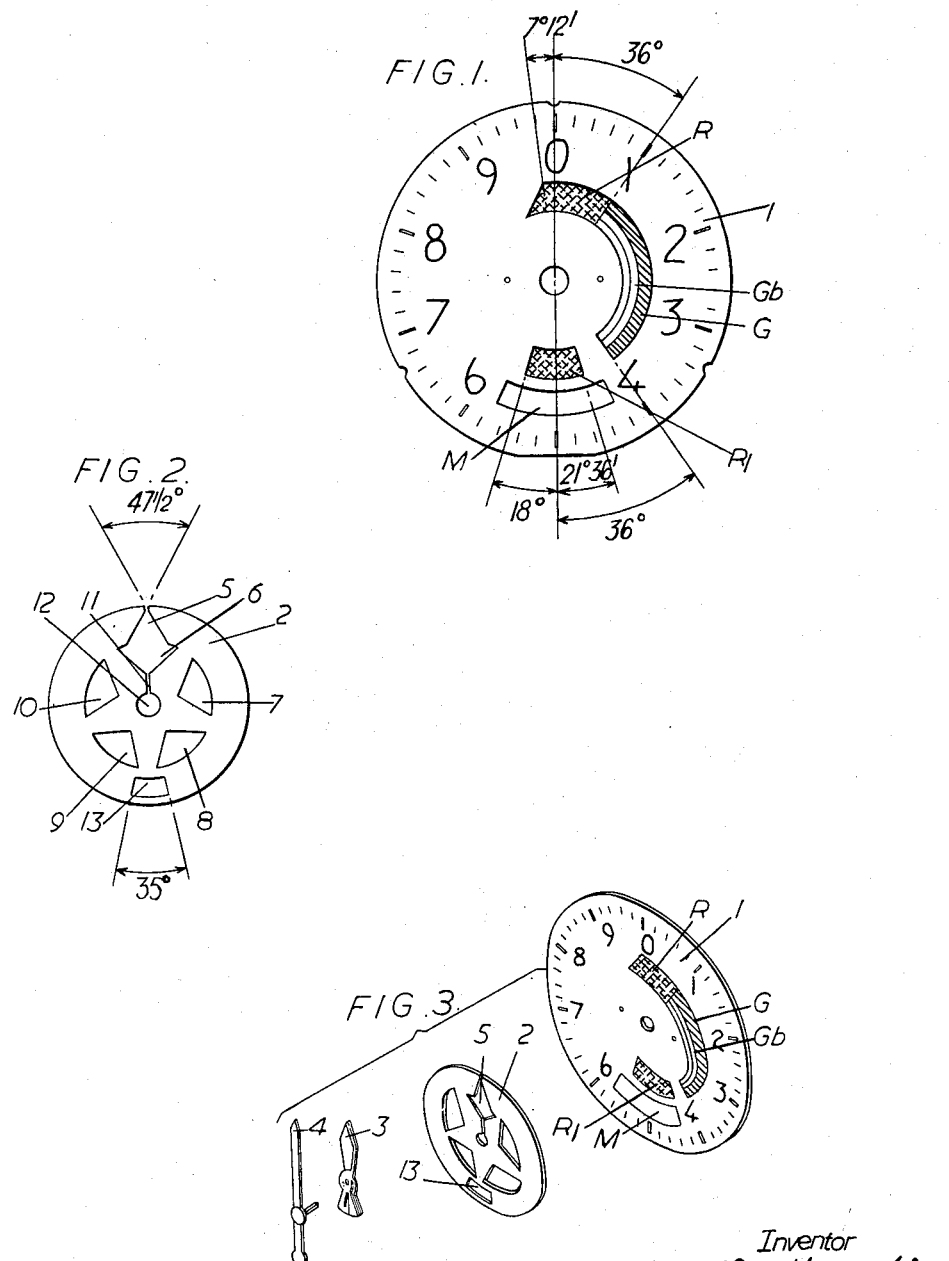
Inventor
Marion Leon Kurowski
By William L. Silverman
Attorney Dec. 31, 1963   M. L. KUROWSKI   3,115,863
AIRCRAFT ALTIMETERS Filed June 17, 1960   2 Sheets-Sheet 2

Inventor
Marion Geow Kurowski
By William R. Lieberman

Attorney

United States Patent Office 3,115,863
Patented Dec. 31, 1963

3,115,863
AIRCRAFT ALTIMETERS
Marion L. Kurowski, Mabelreign, Salisbury, Southern Rhodesia, assignor to Central African Airways Corporation, Salisbury, Southern Rhodesia, a corporation of Southern Rhodesia
Filed June 17, 1960, Ser. No. 36,788
11 Claims. (Cl. 116—129)

This invention relates to dial structures for altimeters of the kind used in aircraft and in which a barometric capsule or other barometrically-responsive driving means, in responding to atmospheric pressure changes related to altitude, is used to rotate relative to a dial a pair of pointers, one of which (usually longer than the other) indicates hundreds of feet against the dial scale markings, while the other against the same markings, indicates thousands of feet. A third needle or pointer traversing the same scale markings has also been provided in a capsule driven instrument to indicate tens of thousands of feet, and it has been arranged to cause a warning "flag" to come into view on the dial at, and remain in view below, a critical altitude, such as 15,000 feet. This invention is particularly concerned with the provision in an instrument of the aforesaid kind, by means of a third member, of an adequate and unmistakable visual warning that the aircraft is flying below a selected critical altitude and the achievement of this end without imposing any objectionable, e.g. rotationally unbalanced, load on the driving gear and its motivating capsule or other drive.

According to the invention in an altimeter of the kind referred to above, sub-critical altitudes visual warning is brought about by the exposure through a small aperture near the circumference of a rotary disc, at, and below, such altitudes, of a red or other characteristic warning color which is applied over a selected arcuate area of the dial within the scale markings and which area is masked by the disc from exposure at higher altitudes.

The disc aperture is conveniently of triangular arrow-head shape with its apex or point reaching to the circumference of the disc. The disc thus provides the third member aforesaid, i.e. takes the place of the known third needle or pointer, its said aperture traversing the dial scale and serving as a pointer indicating tens of thousands of feet thereon.

Preferably also the disc comprises a second aperture diametrically opposed to the first or pointer aperture but not reaching the disc circumference, although lying close to it. This second aperture to distinguish it from the first, is of kidney or other segmental shape, and a further arcuate area of a warning color is provided on the dial so as also to be exposed through the second aperture, then appearing as soon as the pointer aperture indicates a sub-critical altitude by its exposure of warning color.

The disc may be a light metal stamping, black surfaced like the customary dial, having lightening holes about its central region within an annular outer margin in which the pointer (and other) apertures occur, the arrangement and area of the holes and apertures being such as to preserve rotational balance and reduce the effort required for driving the disc, and also to avoid distortion of the disc over wide temperature ranges.

The colored arcuate areas are preferably painted directly on the face of the dial advantageously with luminous or fluorescent materials so as to show up distinctly through the aperture or apertures in strong contrast with the black surface of both the dial and the disc.

Preferably an arcuate area of green or other color conventionally associated with safety, is arranged contiguous with the "higher altitude" end of the red or warning color area with which the pointer aperture co-operates, and extends so far in the higher altitude direction (to the reading of the maximum altitude to which the altimeter is rated) as to be exposed by the pointer aperture so long as the aircraft is flying at a safe height. Black line hatching on the "safe" color area, or preferably a continuous medial line thereon, assists to reduce eye fatigue from the continuous exposure of that color. Such green or "safe" color is not exposed through the second aperture.

The invention will be more readily understood by reference to the accompanying drawings, which show one convenient embodiment and in which:

FIGURE 1 is a front view of the altitude dial angularly scaled in a conventional manner;

FIGURE 2 is a front view of the rotary disc (indicating 10,000's of feet against the dial);

FIGURE 3 is an axially-exploded perspective view on a reduced scale of the operative assembly of the dial, the disc and the conventional short and long pointers (respectively indicating in the 1,000's and 100's of feet);

Figure 4:
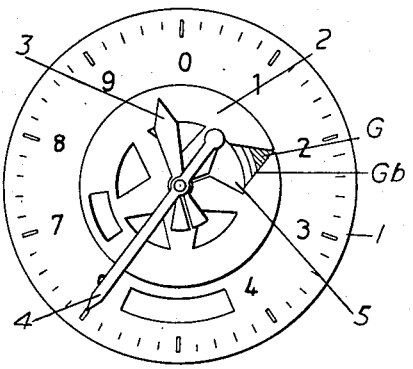
FIGURES 4, 5, 6 and 7 are front dial views of the instrument, as appearing at successively lower altitudes respectively.

In the drawings, dial 1, over which the short and long pointers 3 and 4 respectively are movable in known manner has within the scale three arcuate annular areas R, G and $R_1$ concentric with the dial and of equal internal and external diameters. With the exception of these areas, the dial is conventional as to scale markings, dark or black background and window M for displaying millibar reading through the dial.

The areas R and $R_1$ are colored orange-red, contrasting strongly with the black dial background, as also does the area G, which is colored green and includes from end to end a well-defined arcuate medial line $Gb$, black like the dial background.

The disc 2 has a diameter slightly greater than the outside diameter of the colored dial areas R, G, and $R_1$, and the aperture 5 through it, of the arrow-head shape shown, which provides the 10,000 feet pointer, extends at its apex through the disc circumference and, at its base, into one of several segmental lightening apertures as 6, 7, 8, 9 and 10, extending to concentric arcs of slightly less diameter than the internal diameter of the aforesaid colored dial areas. The aperture 6 is slit at 11 into the central hole 12 of the disc 2, which is thus cut through along a radius from the center to the rim for the avoidance of distortion as mentioned above.

The further aperture 13 in disc 2 occurs diametrically opposite to the pointer aperture 5.

The angular extents of the colored dial areas and the disc apertures 5 and 13 are indicated on FIGURES 1 and 2 as applicable to the particular case, the subject of this example.

Figure 5:
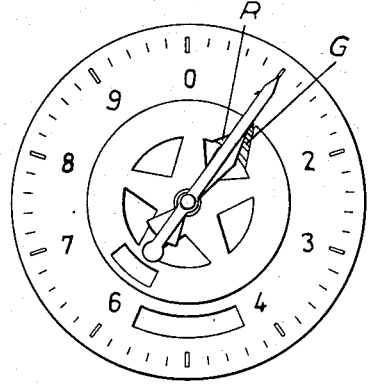
Figure 6:
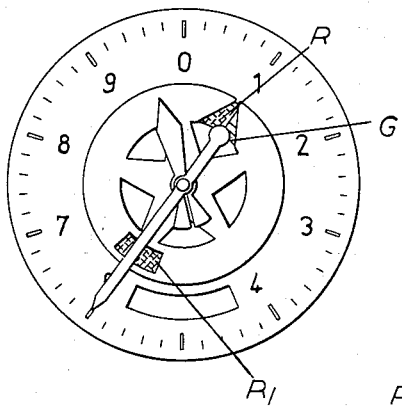
Figure 7:
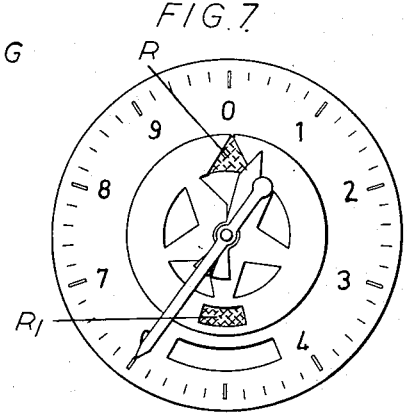

Referring now to FIGURE 4 which shows the appearance of the instrument at a safe altitude (19,600 feet), the green area G alone appears through the disc pointer aperture 5. In FIGURE 5, on descent (to altitude 11,100 feet) the orange-red area R has appeared at the expense of the green. In FIGURE 6 (on further descent to 9,600 feet—i.e. below the safe altitude) red shows more than green in the pointer aperture and, furthermore, also starts appearing (as $R_1$) in the diametrically opposed disc aperture 13. With still further reduction of altitude (as at 600 feet) see FIGURE 7, orange-red R occupies the whole area; the full exposure of the red $R_1$ in the other aperture being achieved about zero altitude. If desired, the colored arcuate area or areas R, G, $R_1$ are provided on a concentric inner disc section of the dial, within a circumference defined by the outer diameter of the colored areas and the dotted lines in FIGURE 1, which disc section is overlaid by apertured disc 2 and is angularly displaceable with respect to the remaining outer or scale-bearing fixed annular section of the dial by a suitable control, whereby the altitude reading at which the warning color appears through the disc pointer and the aforementioned second disc aperture, if such be provided, may be adjusted over a range of, say, ten thousand to fifteen thousand feet.

The invention is not limited by the foregoing specific examples but is capable of being carried into effect in various other ways, within the ambit of the appended claims.

I claim:

1. In an aircraft altimeter having a stationary dial provided with an altitude scale and pointers rotatably movable at different relative speeds over said dial responsively to altitude changes, a member directly overlying said dial masking one part of the dial and having an aperture formed therein of a shape defining one of said pointers and exposing in its movements relative to the dial another part of said dial, said other dial part having at least one area differentially colored from the rest of the dial and so disposed thereon as to be exposed through said aperture only when the aperture points to a scale reading on the dial corresponding to a predetermined critical altitude and every lower reading on the altitude scale.

2. In an aircraft altimeter having a stationary dial provided with an altitude scale and pointers rotatably movable at different relative speeds over said dial responsively to altitude changes, a member directly overlying said dial masking one part of the dial and having an aperture formed therein of a shape defining one of said pointers and exposing in its movements relative to the dial another part thereof, said other dial part having coadjacent areas differentially colored from the rest of the dial and so disposed thereon as to be exposed selectively through the said aperture according to the region of the dial scale at which said aperture points.

3. Aircraft altimeter as claimed in claim 2 wherein the altitude-scaled dial is circular, the apertured member is a disc effectively masking the differentially colored part of the dial area within the scale and said coadjacent differentially colored areas selectively exposed through the disc aperture meet one another radially opposite to a dial scale reading denoting a predetermined critical altitude.

4. An altimeter according to claim 3 wherein the disc aperture is of generally triangular arrow-head shape with its apex reaching to the circumference of the disc, which disc aperture in traversing the dial scale serves as a pointer indicating tens of thousands of feet altitude.

5. An altimeter as claimed in claim 3 wherein the apertured disc comprises a second aperture and a further colored area is provided on the dial in such a way as also to be exposed by said second aperture at altitudes indicated by the first or pointer aperture.

6. An altimeter as claimed in claim 2 wherein the pointer aperture and the junction between the differentially colored areas are adapted to co-operate in such a way as sharply to expose warning color when the pointer aperture indicates altitude close to the critical altitude.

7. An altimeter according to claim 2 with differentially colored contiguous dial areas selectively exposed by the moving aperture pointer, that one of those areas which is exposed by the pointer aperture at "safe" altitudes being so extensive as to be so exposed at all altitudes above the critical altitude within the range of the instrument.

8. In an altimeter as claimed in claim 1, said other dial part being adjustably movable in relation to the rest of the dial in similar directions to the altitude indicating movements of the movable pointer.

9. In an altimeter as claimed in claim 1, said member being a disc concentrically mounted against said dial and masking a central part thereof within the scale markings thereon.

10. In an altimeter as claimed in claim 2, said scaled dial being circular, said member being a disc concentrically mounted against said dial and masking a central part thereof within the scale markings thereon.

11. In an aircraft altimeter having a stationary dial provided with an altitude scale and at least one pointer rotatably movable over said dial in response to altitude changes, a member directly overlying said dial masking one part of the dial and rotatably movable in response to altitude changes at a rate different from that of said pointer, said member having an aperture formed therein exposing in its movements relative to the dial another part of said dial, said other dial part having at least one area differentially colored from the rest of the dial and so disposed thereon as to be exposed through said aperture only when the aperture is disposed along said dial corresponding to a predetermined critical altitude and every lower reading on the altitude scale.

References Cited in the file of this patent

UNITED STATES PATENTS

| 2,108,342 | Le Fevre | Feb. 15, 1938 |
| 2,238,718 | De Florez et al. | Apr. 15, 1941 |
| 2,317,109 | Oxland | Apr. 20, 1943 |
| 2,832,220 | Logie | Apr. 29, 1958 |